Patented Apr. 1, 1930

1,752,935

UNITED STATES PATENT OFFICE

JOSEPH A. WYLER, OF ALLENTOWN, PENNSYLVANIA, ASSIGNOR TO TROJAN POWDER COMPANY, A CORPORATION OF NEW YORK

ARTIFICIAL FUEL

No Drawing.   Application filed January 9, 1928.   Serial No. 245,627.

My invention relates to improvements in artificial fuel, and more particularly relates to an improved solid and infusible alcohol fuel. The principal object of my invention is to provide a solid fuel which will not melt during its burning, and which will burn without leaving more than a small amount of residue. One of the objects of my invention is to enable an infusible solid product to be made from an alcohol or a mixture of alcohols that will remain solid during combustion, and that will burn completely without leaving any substantial amount of ash or other residue.

It is well known that solidified products may be made from methyl or from ethyl alcohol, or from mixtures of these two alcohols, by the use of metallic soaps as solidifying agents, and it is also well known that related solidified products may be made from alcohols by the use of nitrocellulose as a solidifying agent. My invention relates to improved products containing neither metallic soaps nor nitrocellulose, and possessing many advantages over such solidified products as have been previously made by the use of known solidifying agents.

I have discovered that when nitrostarch is dissolved in a suitable solvent, such as commercial 95% methyl alcohol for example, and when such solution is admixed with an alcohol containing a suitable amount of water or other equivalent precipitating agent, solidified products may be obtained possessing greater homogeneity than is possible by the use of nitrocellulose as a colloiding agent, and in addition possessing very desirable properties of firmness of texture and uniformity of burning. One significant advantage of my present products, as compared with the nitrocellulose products previously made, is the materially higher content of nitrated product which it is possible to have present in the solidified mixture, without obtaining notable lack of homogeneity or variation in texture. Using nitrocellulose, products containing a high percentage of the nitrated cellulose tend to be very spongy, as compared with products containing a like amount of nitrostarch and possess a texture which is relatively poor, although by my present invention I may obtain products containing from 10% to 20% of nitrostarch if desired, without such products being noticeably heterogeneous or "stringy".

As an example of the procedure which I prefer to follow in the preparation of solidified alcohol products by my present invention, I may dissolve 12 parts by weight of nitrated starch of a nitrogen content of 13.50% in 72 parts by weight of commercial 95% methyl alcohol. The nitrostarch will be found to dissolve readily in the methyl alcohol, and will give a slightly opalescent solution. To the above solution representing 84 parts by weight I may add 8 parts by weight of commercial 95% ethyl alcohol, the two liquids being preferably added together rapidly with vigorous stirring. The resulting product is an opalescent liquid, of somewhat increased viscosity as compared with the alcohol used in its preparation, and is now ready to be subjected to the final solidifying step. To 92 parts by weight of the above product, I next add 9 parts by weight of water, this water being preferably added in a fine stream, or as a spray of fine droplets, the alcohol mixture being meanwhile gently agitated by shaking, but preferably not being stirred, as stirring or whipping tends to break up the uniform colloidal condition of the resulting "gel".

Upon completion of the addition of water, the product will be found to be a solid product of slightly cellular texture, and of fair firmness or coherence. Upon being ignited the product burns uniformly with hot smokeless flame, without melting, and burns completely without leaving more than a very slight amount of carbonaceous residue, the quantity of such residue being so small as to be wholly unobjectionable. As the 72 parts of commercial 95% methyl alcohol used in the preparation of the above product represents 67 parts by weight of pure methyl alcohol and 5 parts by weight of water, and as the 8 parts of 95% ethyl alcohol represents 7.4 parts by weight of pure ethyl alcohol and .6 parts by weight of water, the actual percentage composition of the above solidified product is as follows:

| | Per cent |
|---|---|
| Methyl alcohol | 66.3 |
| Ethyl alcohol | 7.3 |
| Water | 14.5 |
| Nitrostarch 13.50% $N_2$ | 11.9 |
| | 100.0 |

The percentage composition of the alcohol-water mixture is as follows:

| | Per cent |
|---|---|
| Methyl alcohol | 75.3 |
| Ethyl alcohol | 8.3 |
| Water | 16.4 |
| | 100.0 | and 13.5 parts of nitrostarch of 13.50% nitrogen is used to each 100 parts by weight of the above alcohol-water mixture.

As another example of a product made in accordance with my present invention I may dissolve 10.5 parts of nitrostarch of 13.50% nitrogen in 54 parts by weight of 95% methyl alcohol, and to this solution I may add 12.8 parts by weight of 85% (by volume) ethyl alcohol. The resultant mixture is the solidified product and has the following percentage composition:

| | Per cent |
|---|---|
| Methyl alcohol | 64.9 |
| Ethyl alcohol | 13.2 |
| Water | 8.3 |
| Nitrostarch | 13.6 |
| | 100.0 |

A rather wide latitude as regards the amount of nitrostarch used in the solution is possible. For example, good gels or solids are obtained when as low as 4 parts of nitrostarch are dissolved in 72 parts of 95% methyl alcohol in place of the 12 parts of nitrostarch used in the first example above, the quantities of ethyl alcohol and water required to produce the gel are not materially changed but the more concentrated nitrostarch-methyl alcohol solutions produce the more rigid products.

The manner of mixing in the coagulants or gelling agents as ethyl alcohol and water or water, is an important factor in the production of the gels. The amount of alcohol solution that can be caught up and retained by the gel depends upon the manner in which the gelling agents are added. Preferred results are obtained when these agents are introduced into the solution in small individual droplets well dispersed throughout the solution, care being taken to prevent the injection or introduction of the gelling agents into that part of the mass that has already been gelled.

As still another example of a product made in accordance with my present invention I may dissolve an amount of nitrostarch in a mixture of the above solvents so as to have a final resultant mixture of the following composition:

| | Per cent |
|---|---|
| Nitrostarch containing 12.25% nitrogen | 10.6 |
| Methyl alcohol (100% $CH_3OH$) | 41.0 |
| Ethyl alcohol (100% $C_2H_5OH$) | 27.4 |
| Water | 21.0 |
| | 100.0 |

The above mixture is a thick viscous liquid, which becomes solid upon being exposed to air to permit the evaporation of a small portion of its contained alcohol. This mixture possesses the desirable characteristic of being sufficiently fluid to permit it to be poured into suitable packing containers and to then solidify to a product of suitable firmness to withstand handling and shipping, by exposing the filled cans, before final closure, to conditions favorable to the evaporation of a small part of the contained alcohol. When packaged in two ounce cans, standing in a room at ordinary temperature for a period of from ten minutes to one hour will be sufficient to cause the viscous liquid product to change over to a product of satisfactory firmness. Exposure of the open cans to a stream of warm dry air will also cause the viscous liquid product to "solidify" in from five to fifteen minutes.

Although in the above described examples I have referred specifically to the use of nitrostarch of 12.25% and 13.52% $N_2$, I have discovered that by suitable modification of the proportions of the various materials used, I may obtain satisfactory solidified products by the use of nitrostarch having a wide range of nitrogen content. It is to be particularly pointed out that although solidified products have been made from alcohol by the use of nitrocellulose, the nitrogen content of the nitrocellulose is recoginzed to be extremely critical, and a variation of as little as one-tenth of one per cent in the nitrogen content of the nitrocellulose is considered to lead to the production of products which are commercially unsatisfactory, one of the marked factors of superiority of nitrostarch when used in accordance with the disclosure of my present invention being its adaptability over a wide range of nitrogen content.

By "nitrostarch" as used throughout this specification and the claims, is meant nitrated starch having a nitrogen content within the range of 9.00% $N_2$ to 14.12% $N_2$, but nitrostarch having a nitrogen content of from 9.50% $N_2$ to 13.60% $N_2$ is preferred. The particular type of starch employed in the preparation of the nitrostarch is not significant and substantially equivalent results are obtained from the use of nitrostarch of the desired nitrogen range prepared from such raw materials as corn starch, cassava starch and potato starch.

Although I have referred particularly to the use of methyl alcohol and ethyl alcohol, my invention is broadly applicable to the use of other alcohols as well, and I have successfully employed isopropyl alcohol, amyl alcohol and others as equivalents of ethyl alcohol with satisfactory results.

I have also discovered that certain agents assist in the formation of a gel, either through forming a firmer gel than would be given by an equivalent mixture without the aid of such assisting agent, or through forming a gel in a mixture that would not gel in the absence of such assisting agent. Among the assisting agents which I have found to give the best results are formaldehyde, furfural, hexamethylenetetramine, urea, oleic acid, or mixtures of any two or more of these agents. As an example of the use of such "assisting agents" in the formation of gels in accordance with my present invention the following composition is illustrative:

|  | Per cent |
|---|---|
| Nitrostarch | 13.6 |
| Methyl alcohol | 63.9 |
| Ethyl alcohol | 13.2 |
| Formaldehyde | 2.0 |
| Water | 7.3 |
|  | 100.0 |

My present invention enables me to obtain products either possessing marked homogeneity, by the application of the methods already described herein, or to obtain higher cellular products, where such products may for any reason be of advantage. As an example of the method which I may employ in the preparation of a cellular product of decided firmness of texture and relatively high alcohol content I may spray thin layers of the nitrostarch solution with the jellying agent (diluted ethyl alcohol) and having thus caused the formation of droplets, I then cause a thin layer of the original nitrostarch solution to flow over the droplets. In this way I seal and strengthen the layer which now has a honeycomb structure and prepare for the imposition of another such layer above it. These layers are built up upon each other to any desired thickness.

Another method by which I may build up a porous structure, is that usually used at present in allied industries, i. e. causing the formation of capillary tubules in which an excess of diluted ethyl alcohol is contained, the walls of the tubules consisting of the gelled nitrostarch.

Another method by which I may build up a porous nitrostarch is by spraying the nitrostarch solution into a spray of the jellying solution, allowing the gelled droplets to fall a short distance through an air space.

Although I have described certain particular embodiments of my invention, it is to be understood that I do not wish to be limited to the exact methods or products as herein described but desire to cover all such changes and modifications as come within the spirit and scope of the appended claims.

I claim:
1. An artificial infusible fuel comprising a solidified mixture of alcohol and nitrostarch.
2. An artificial infusible ash-free fuel comprising a solidified mixture of methyl alcohol, ethyl alcohol, water and nitrostarch.
3. An artificial infusible fuel comprising a solidified mixture of methyl alcohol, ethyl alcohol, furfural, water and nitrostarch.

In testimony whereof, I have hereunto subscribed my name this 7th day of January, 1928.

JOSEPH A. WYLER.